United States Patent [19]

Lyga

[11] Patent Number: 5,318,161
[45] Date of Patent: Jun. 7, 1994

[54] WRAP SPRING CLUTCH ASSEMBLY

[75] Inventor: Thomas M. Lyga, Torrington, Conn.

[73] Assignee: Pitney Bowes Inc., Stamford, Conn.

[21] Appl. No.: 14,727

[22] Filed: Feb. 8, 1993

[51] Int. Cl.5 ............................................. F16D 13/08
[52] U.S. Cl. ................................ 192/81 C; 192/41 S; 192/107 T
[58] Field of Search ............ 192/8 C, 26, 33 C, 41 S, 192/81 C, 107 T; 188/77 W, 82.6

[56] References Cited

U.S. PATENT DOCUMENTS

| | | | |
|---|---|---|---|
| 2,566,539 | 9/1951 | Starkey | 192/81 C X |
| 2,643,750 | 6/1953 | Moulton | 192/81 C X |
| 4,760,903 | 8/1988 | Stegelmeier et al. | 192/26 |
| 5,064,137 | 11/1991 | Komatsu | 192/81 C X |

FOREIGN PATENT DOCUMENTS 4-88242  3/1992  Japan ................. 192/41 S

*Primary Examiner*—Richard M. Lorence
*Attorney, Agent, or Firm*—Charles G. Parks, Jr.; Melvin J. Scolnick

[57] ABSTRACT

A wrap spring clutch assembly is disclosed which is designed for use with a rotary element which is subjected to repeated intermittent rotary motion. The clutch assembly includes a first circular hub fixedly attached to the element for rotation therewith, a wrap spring mounted on the first hub and adapted to grip or release the hub depending on the direction of movement of a free tang of the wrap spring. A second, split hub acting as a resilient shock absorber is mounted on the rotary element and underlies a portion of the wrap spring so as to deflect inwardly when the wrap spring grips the first hub thereby permitting a small amount of additional rotation of the rotary element to provide a controlled deceleration of the rotary element, thereby absorbing the shock force of virtual instantaneous deceleration of the rotary element which otherwise occurs and tends to break the wrap spring at the juncture of the spring coils and the tang which is attached to the rotary element.

3 Claims, 6 Drawing Sheets

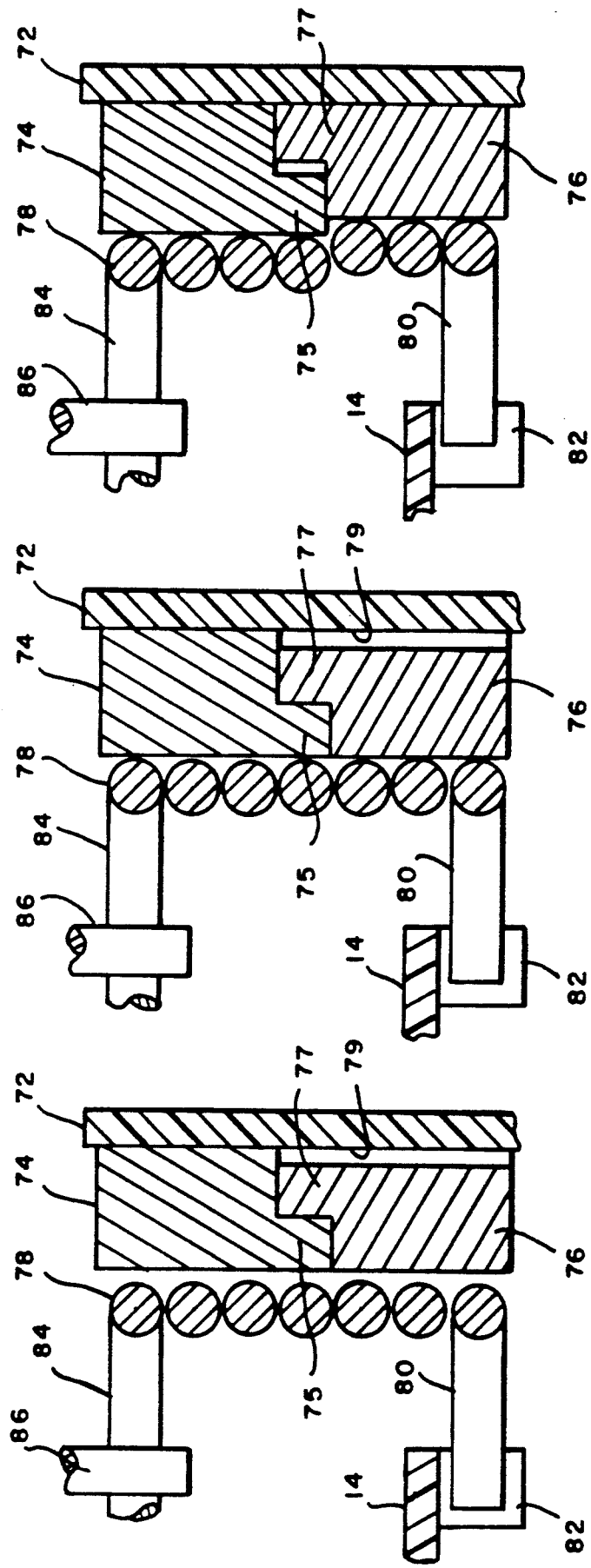

WRAP SPRING CLUTCH ASSEMBLY

CROSS REFERENCE TO RELATED APPLICATIONS

This application discloses and claims an improvement in the invention disclosed and claimed in U.S. patent application Ser. No. 685,783, filed Apr. 16, 1991, now abandoned and assigned to the assignee of this application.

BACKGROUND OF THE INVENTION

This invention relates generally to the field of clutch assemblies for engaging and disengaging a source of driving power to a moveable element, and more particularly to that type of clutch assembly generally known as the wrap spring clutch. Clutch assemblies of one type or another have long been well known, since they constitute a very convenient and relatively simple mechanism for alternately connecting and disconnecting a movable element either from a source of driving power for moving the element, or from a fixed member for arresting already occurring movement of the element. Possibly the most common and well known form of clutch assembly is that in which a pair of friction members are caused to engage and disengage each other by an external force. One of the friction members is connected either to the source of driving power for moving the movable member, or to the fixed member for arresting movement of the movable member in the manner of a brake, depending on the function of the clutch, the other friction member being connected to the movable element. When the friction members are disengaged, the movable element is non-driven or non-arrested, as the case may be; when the friction members are engaged, the movable element is connected either to the source of power or the fixed member, as the case may be, for moving the movable element or for holding it stationary.

One common form of clutch assembly is the so called wrap spring clutch, which is utilized most frequently, if not exclusively, for controlling the rotary motion of an element mounted for rotation about a central axis, such as a shaft. In this environment, the clutch member which connects and disconnects a source of driving power from a driven element is simply a coil spring having a pair of outwardly projecting tabs or tangs, one on each end of the coil, for connecting the coil to either the source of power or the fixed member, as the case may be, and the driven element. The wrap spring clutch has considerable utility in that it can be used both for driving an element mounted for axial rotation or for stopping the rotary movement of an element already in motion.

There are several major advantages of the wrap spring clutch which render it highly suitable for the foregoing purpose. One is that it requires very little input motion from an external source to change the operating mode of the clutch from engaged to disengaged and vice versa. Another is that either change in operating mode occurs with very little motion of the clutch spring, thereby permitting the change to be virtually instantaneous. A still further advantage is that it exerts tremendous gripping force on the movable element when it is engaged therewith. The combined effect of these advantages is that the wrap spring clutch is very convenient and effective in situations where it is necessary or desirable to achieve extremely rapid acceleration or deceleration, as the case may be, of a movable element.

A problem that often develops in the use of wrap spring clutches, particularly in the situation where it is used to arrest the movement of a rotating element, is that the extremely rapid deceleration of the element generates a shock load in the wrap spring which places sufficient stress on the juncture of the fixed tang with the first coil of the wrap spring that the tang breaks off the coil due to fracture of the metal at the juncture. When this occurs, the spring, of course, is useless and must be replaced. This results in both unproductive down time of the equipment in which the wrap spring clutch is being utilized and the expense of the labor required to disassemble various parts to gain access to the wrap spring for replacement and to reassemble these parts. This was the major problem with the apparatus described in the above mentioned patent application.

Attempts to solve this problem by the use of heavier, stronger springs have not proved satisfactory since the resistance of the spring to movement in the unwinding direction to release the movable element for motion often exceeds the force that is available to move the tang on the movable end of the spring. This is particularly so in the case of the machine in which the wrap spring clutch of the present invention is utilized, since, as will be seen in detail below, the force for moving the spring in the unwinding direction is provided only by a spring loaded device which controls slack in a strip of paper tape.

SUMMARY OF THE INVENTION

The present invention substantially obviates if not entirely eliminates the above described disadvantage of prior known wrap spring clutches.

To this end, the present invention, in some of its broader aspects, comprises a suitable frame having an element mounted thereon for rotation about a central axis, the element being subjected to repeated intermittent rotary motion by an external force applied to the element. A circular hub is fixedly attached to the element for rotation therewith, and a wrap spring is mounted over the hub. The wrap spring has a radially outwardly projecting tang on each end thereof, one of the tangs being fixedly attached to the frame and the other tang being free for angular movement about the central axis of the rotatable element, so that movement of this tang causes the wrap spring to wind or unwind on the circular hub to thereby grip or release the hub, depending on the direction of movement of the movable tang. A resilient means is rotatably mounted on the rotatable element in a position to underlie a portion of the wrap spring adjacent the fixed tang for absorbing a portion of the shock generated in the wrap spring from the sudden deceleration of the rotatable element when the wrap spring grips the circular hub in response to movement of the movable tang in a direction to wind the wrap spring on the first hub. Thus, the resilient means prevents the wrap spring from absorbing all of the shock resulting from the sudden deceleration of the rotatable element, thereby preventing the fixed tang from breaking.

In its more limited aspects, the resilient means comprises a second circular hub which includes a means for permitting the hub to diminish slightly in diameter against the force of the hub tending to maintain its normal diameter when the portion of the wrap spring which overlies the second hub diminishes in diameter in response to movement of the movable tang in a direction to cause the wrap spring to wind on the first hub. Further, the means which permits the second hub to diminish in diameter is that this hub is discontinuous around its periphery and thereby has ends which define a gap there between, so that when the movable tang moves in a direction to wind the wrap spring on the first hub, the portion thereof which overlies the second hub tends to diminish in diameter and grip the second hub which in turn moves inwardly to diminish in diameter.

Having briefly described the general nature of the present invention, it is a principle object thereof to provide a wrap spring clutch which solves the problem of broken springs in prior wrap spring clutch assemblies.

It is another object of the present invention to provide a wrap spring clutch which is provided with a shock absorbing means to prevent the full force of the shock generated by rapid deceleration of a movable member from breaking the connecting portion of the wrap spring.

These and other objects and features of the present invention will become more apparent from an understanding of the following detailed description of a preferred embodiment of the present invention when considered in conjunction with the accompanying drawings.

BRIEF DESCRIPTION OF THE FIGURES

FIG. 6 is a fragmentary sectional view through the wrap spring clutch showing the position of the parts during free rotation of the tape roll;

FIG. 7 is a view similar to FIG. 6 showing the position of the parts at the instant that the wrap spring clutch becomes engaged;

FIG. 8 is a view similar to FIG. 6 showing the position of the parts when the wrap spring clutch is fully engaged and rotation of the tape roll is prevented;

DETAILED DESCRIPTION OF THE INVENTION

Figure 1:
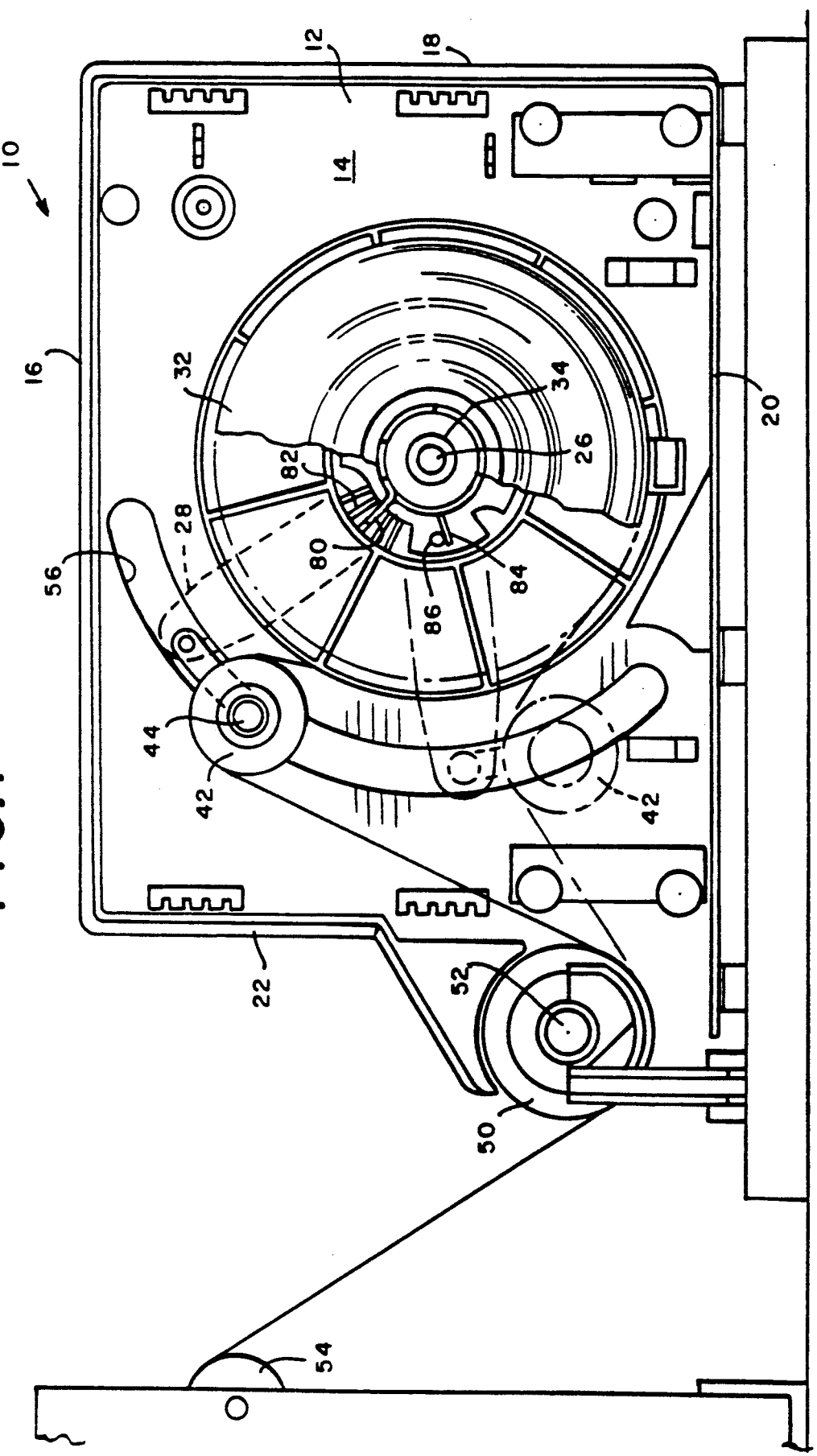
FIG. 1 is a side elevational view of a reeled tape supply apparatus as used in a mailing machine in which the wrap spring clutch of the present invention is utilized.
Figure 2:
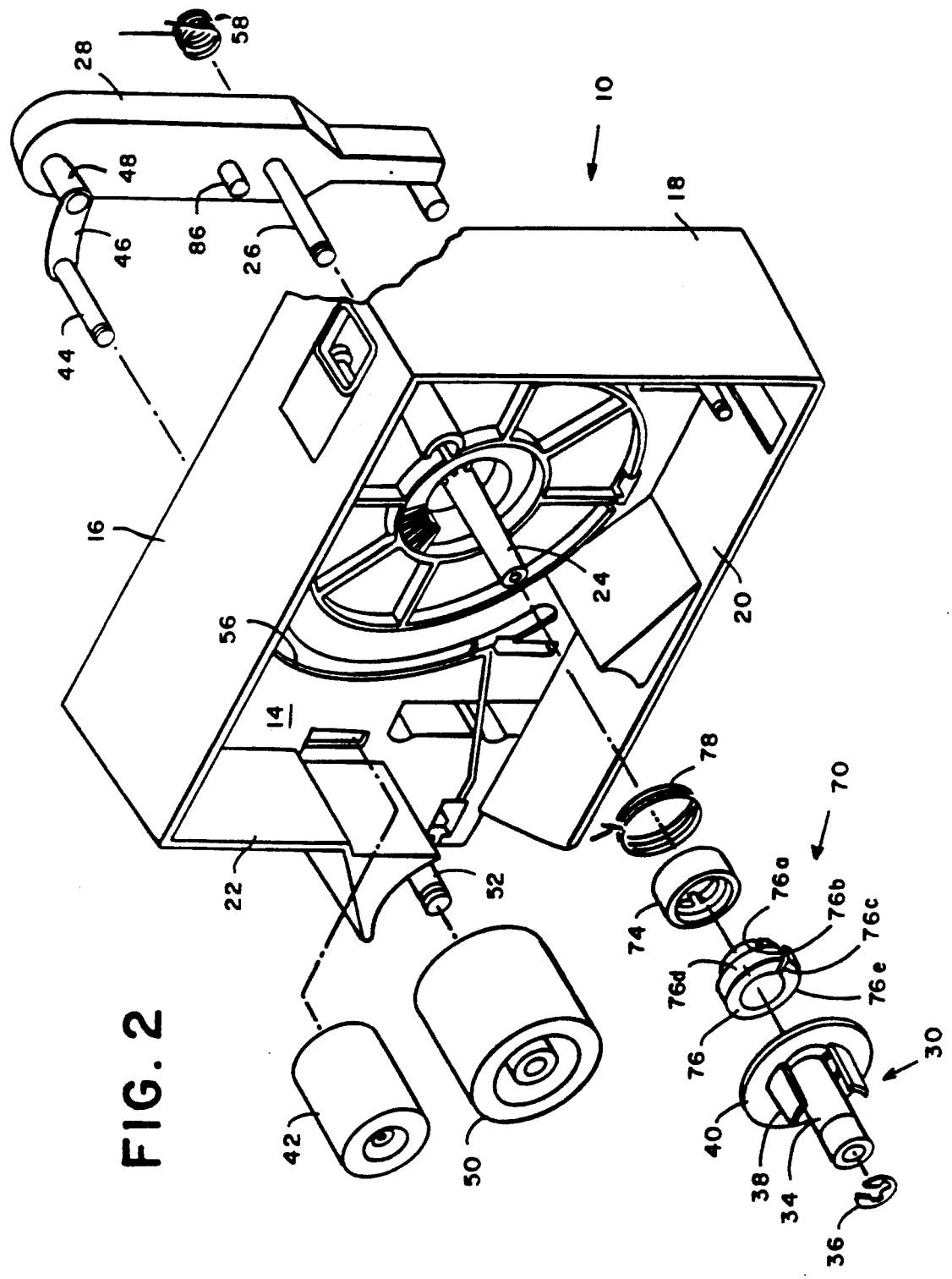
FIG. 2 is an exploded perspective view of the tape supply apparatus shown in FIG. 1.

Referring now to the drawings and particularly to FIGS. 1 and 2 thereof, the present invention resides in a tape storage and tensioning mechanism generally designated by the reference numeral 10. The mechanism 10 is a subassembly of a mailing machine which includes an apparatus for feeding envelopes along a feed deck, a postage meter for printing a postage indicia on the envelopes, and a stacker for receiving the printed envelopes and stacking them in a particular order. The mailing machine also has the capability of printing postage indicia on a piece of sticky back or gummed tape for manual application to envelopes which are too thick or bulky to be fed through the mailing machine. The tape feed mechanism 10 provides a storage receptacle and tape tensioning mechanism for tape which is fed into the mailing machine. No further description of any part of the mailing machine is provided since such machines are well known in the art and form no part of the present invention, except as specifically noted below.

The tape storage and tensioning mechanism 10 comprises a generally rectangular housing 12 which includes an upstanding rear wall 14 and a plurality of side walls 16, 18, 20 and 22, thereby forming a generally box-like configuration. A forwardly projecting tubular protuberance 24 is attached to and formed integrally with the rear wall 14 and encloses a shaft 26 on which an elongate tension arm 28 is mounted for rotation in a manner, and for the purpose, fully explained herein below.

Figure 5:
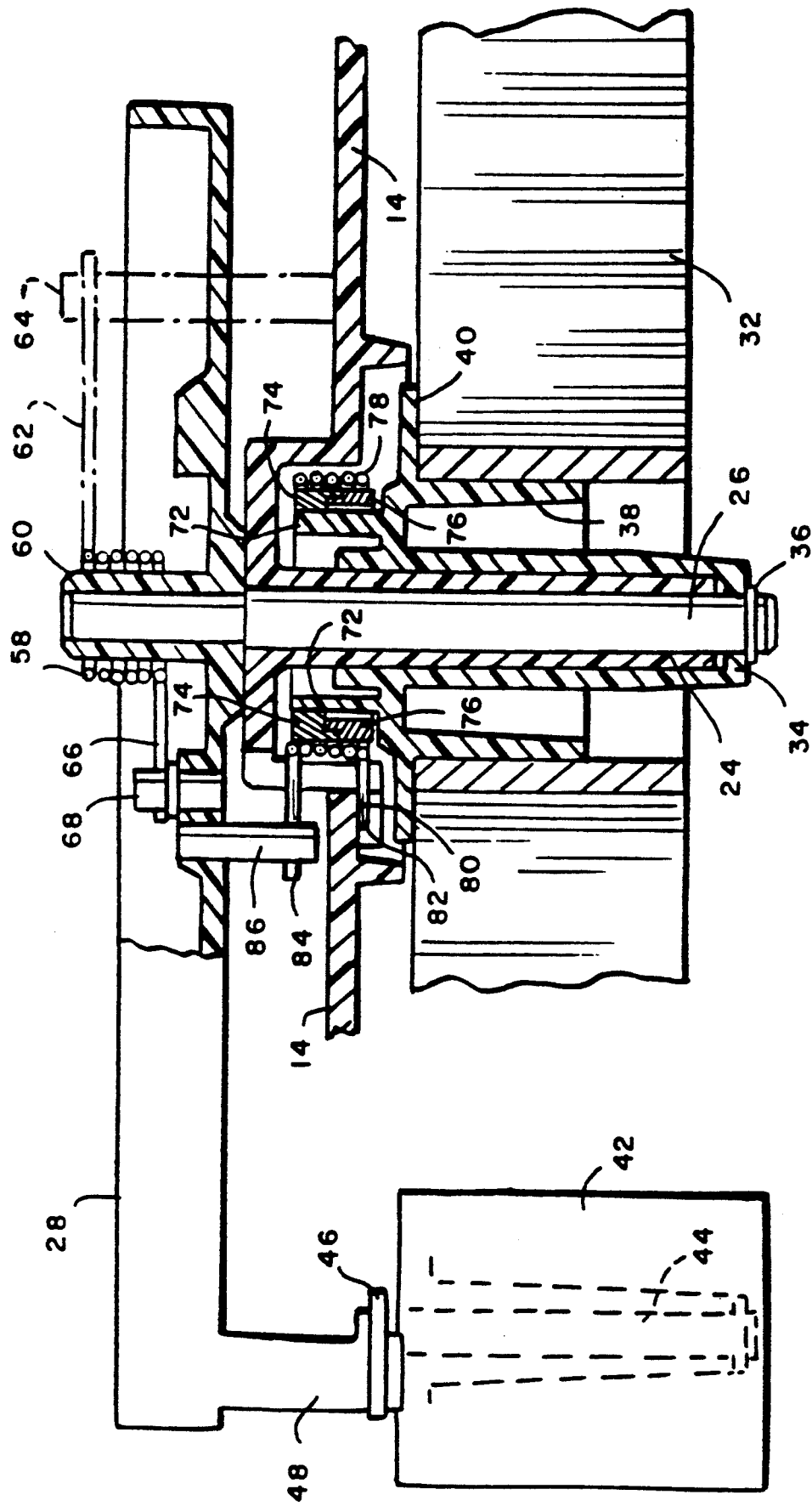
FIG. 5 is a sectional view taken on the line 5—5 of FIG. 3.

With reference to FIGS. 1, 2 and 5, a tape hub assembly generally designated by the numeral 30 is mounted on the outer end of the protuberance 24 for supporting a roll of tape 32 (FIG. 1) which is fed into the mailing machine for the printing of postage indicia thereon as briefly explained above. The tape hub assembly 30 comprises a central tubular portion 34 rotatably supported by the protuberance 24 and held thereon by a retaining clip 36 which snaps onto the end of the shaft 26 in known manner. The tape hub assembly 30 also has axial extending tabs 38 on which the core of the tape roll 32 is mounted, and a rear flange 40 to center the tape roll 32 on the tape hub 30.

As best seen in FIG. 1, tape from the roll 32 is drawn from the bottom of the roll over a movable tensioning roller 42 which is mounted on a shaft 44 which in turn is connected to a link 46 fixed to a shaft 48 mounted on the outer free end of the tensioning arm 28. The function of the tension roller 42 will be described herein below. From the tensioning roller 42, the tape passes under a fixed guide roller 50 which is rotatably mounted on a shaft 52 fixedly mounted on a portion the wall 22. The tape is withdrawn from the roll 32 by means of a suitable feed mechanism generally designated by the numeral 54 which is mounted on a portion of the aforementioned mailing machine. The feed mechanism 54 is effective to withdraw a predetermined length of tape from the tape roll 32 in response to an appropriate signal from the central microprocessor of the mailing machine, thereby intermittently feeding tape from the tape supply and tensioning mechanism 10. Again, neither further details of the feed mechanism nor of the mailing machine microprocessor are further described since they form no part of the present invention.

Figure 3:
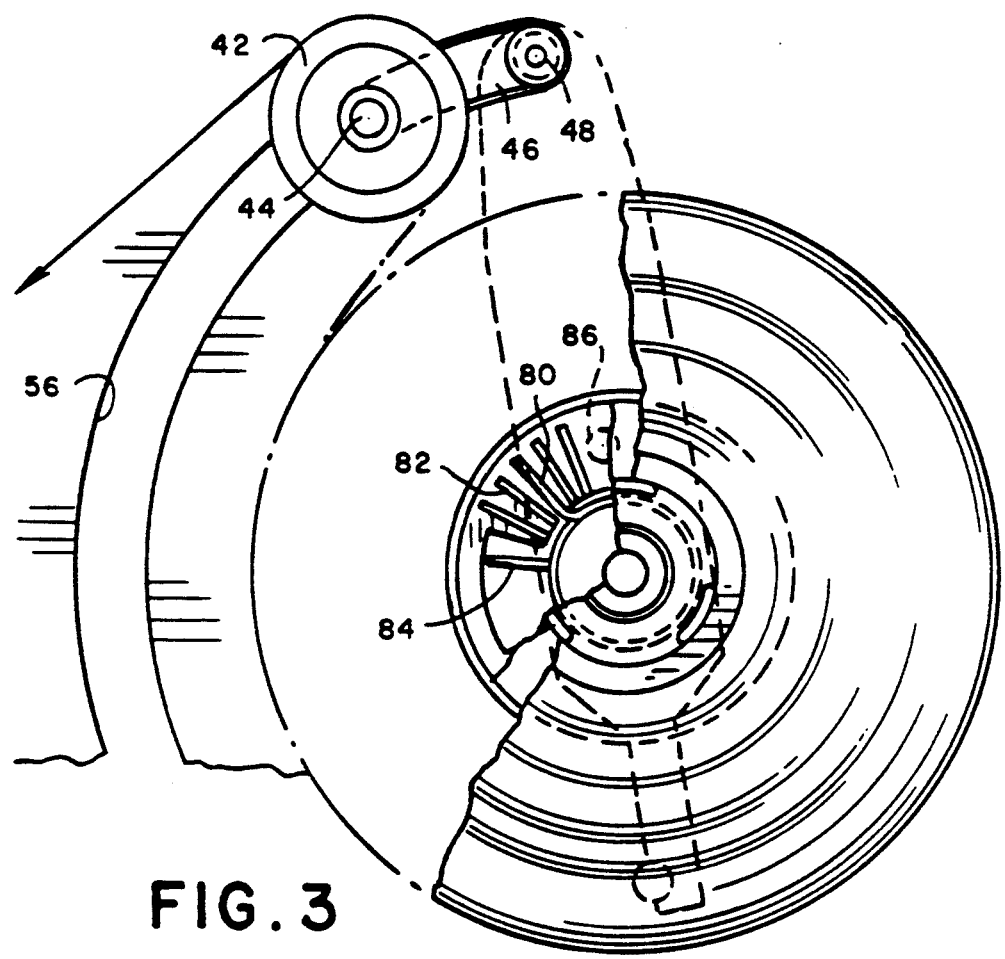
FIG. 3 is a side elevational view of a portion of the tape supply apparatus shown in FIG. 1 with the parts shown in a non-dispensing position.
Figure 4:
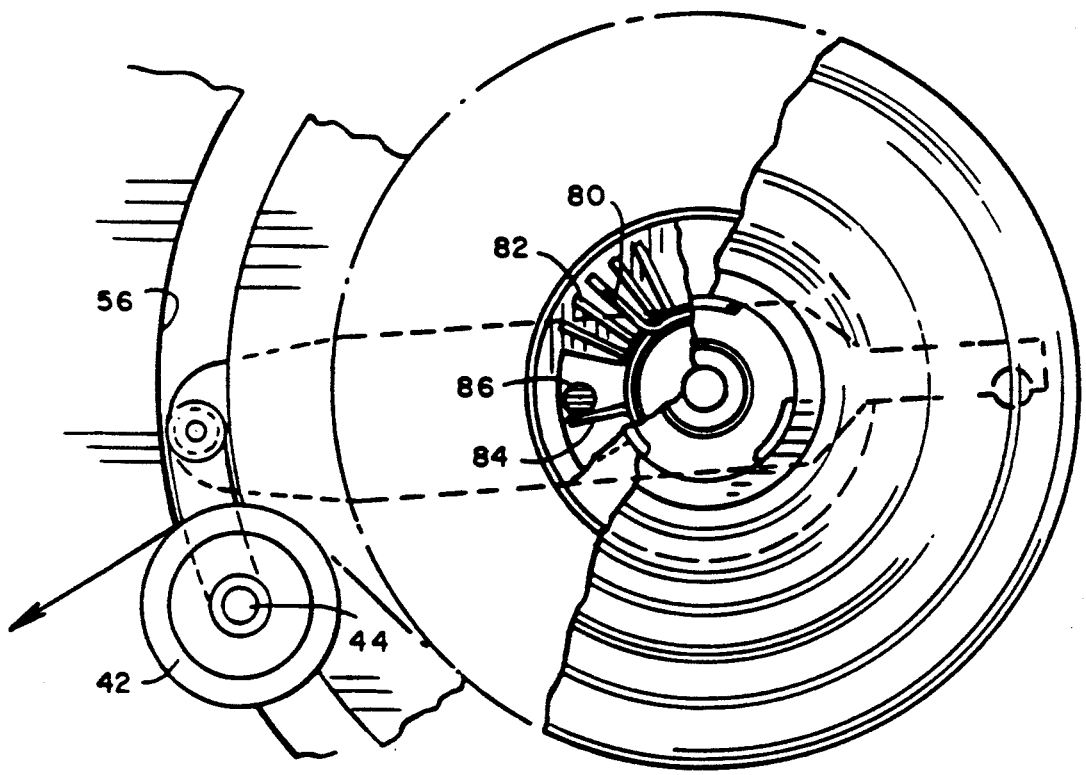
FIG. 4 is a view similar to FIG. 3 but with the parts shown in a dispensing position.

As best seen in FIGS. 1, 3 and 4, the tensioning roller 42 and the tension arm 28 form a means for maintaining proper tension on the tape during intermittent operation of the feed mechanism 52, and a part of an assembly for alternately permitting and restricting rotation of the tape roll 32 as the tape is intermittently pulled from the tape roll 32 by the feed mechanism 52. Thus, the rear wall 14 is provided with an accurate slot 56 through which the shaft 44 extends, and in which the shaft 44 moves between the positions shown in FIGS. 3 and 4 as the tensioning arm 28 rotates about the shaft 26. It will be apparent from FIG. 1 that the amount of slack in the tape between the tape roll 32 and the feed mechanism 54 varies as the tensioning roller 42 moves from the upper solid line position shown in FIG. 1 to the lower dotted line position shown therein, the slack being greater in the former position and less in the latter.

As best seen in FIG. 5, the tension arm 28 is normally biased to the solid line position shown in FIGS. 1 and 3 by a torsion spring 58 which is mounted on a hollow boss 60 which extends rearwardly from the tension arm 28. one end tang 62 of the spring 58 bears against a stub shaft 64 mounted on the rear face of the rear wall 14, and another tang 66 of the spring 58 is connected to a shaft 68 formed on the rear surface of the tension arm 28 in a manner to urge the tension arm 28 in a clockwise direction as viewed in FIGS. 1 and 3.

Rotation of the tape hub assembly 30 and the tape roll 32 is controlled by a wrap spring clutch interconnected between the tape hub assembly 30 and the rear wall 14 on which the tape hub 30 is rotatably mounted. The wrap spring clutch is actuated by the tension arm 28 to alternately lock the tape hub assembly 30 to the wall 14 to prevent rotation of the tape hub and to release the tape hub for free rotation in response to the feed mechanism 52 withdrawing tape from the tape roll 32.

As best seen in FIGS. 2 and 5, the wrap spring clutch, generally designated by the reference numeral 70, is mounted on a rearwardly extending axial annulus 72 (FIG. 5) of the tape hub assembly 30. A circular hub 74 is fixedly mounted on the annulus 72 adjacent the outer free end thereof and extends for approximately one half the length of the annulus 72. Another circular hub 76 is mounted over the annulus 72 but is freely rotatable thereon since the internal diameter of the hub 76 is slightly larger than the external diameter of the annulus 72. The hub 76 is captured between the fixed hub 74 and the rear surface of the flange 40 of the tape hub assembly 30, and it occupies the other half of the length of the annulus 72. As best seen in FIGS. 6, 7 and 8, the fixed hub 74 is provided with a peripheral flange 75, the outer surface of which is contiguous with the outer surface of the hub 74; the other hub 76 is provided with a peripheral flange 77 which is non-contiguous with the inner surface of the hub 76 due to the space 79 between the inner surface of the hub 76 and the outer surface of the annulus. Thus, the flanges 75 and 77 overlap one another so as to center the hub 76 about the annulus 72, thereby providing a substantially uniform outer surface extending from the rearward end of the hub 74 to the forward edge of the hub 76 to provide a relatively smooth contiguous surface for the coils of the wrap spring.

A wrap spring 78 is mounted over the hubs 74 and 76 so as to alternately grip and release these hubs depending on whether one end of the wrap spring is moved angularly in a winding or unwinding direction by the tension arm 28 as described below. One tang 80 of the wrap spring is captured in one of a plurality of slots 82 formed in the front surface of the wall 14 of the housing 12, thereby preventing any angular movement of the tang 80. The other tang 84 of the wrap spring 78 projects outwardly into the path of a shaft 86 carried by the tension arm 28, the tang 84 being positioned such that it is contacted by the shaft 86 only when the tension arm 28 moves to its lower position as seen in FIGS. 1 and 4. Thus, when the tension arm 28 is in its upper position as shown in FIGS. 1 and 3, the shaft 86 is out of contact with the tang 84 of the spring 78.

Figure 9:
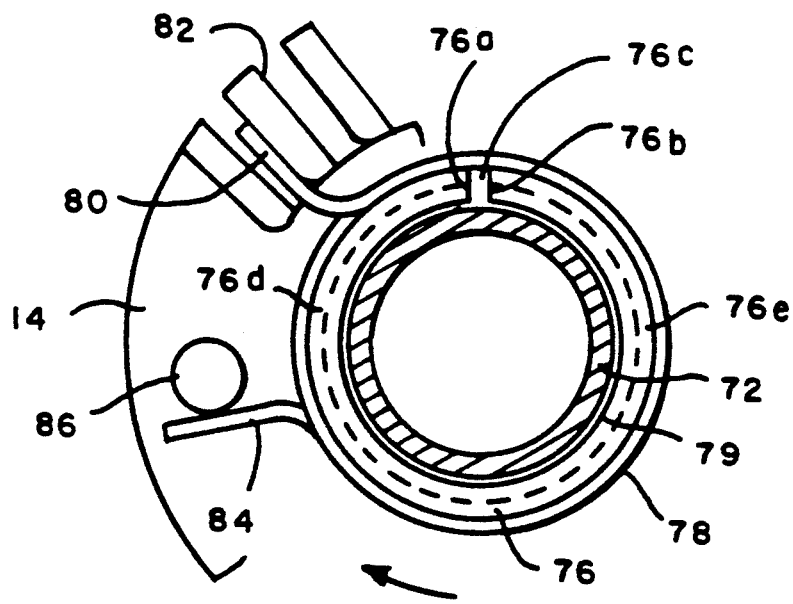
FIG. 9 is a fragmentary side view of the wrap spring clutch showing the parts in the positions they occupy as in FIG. 6.
Figure 10:
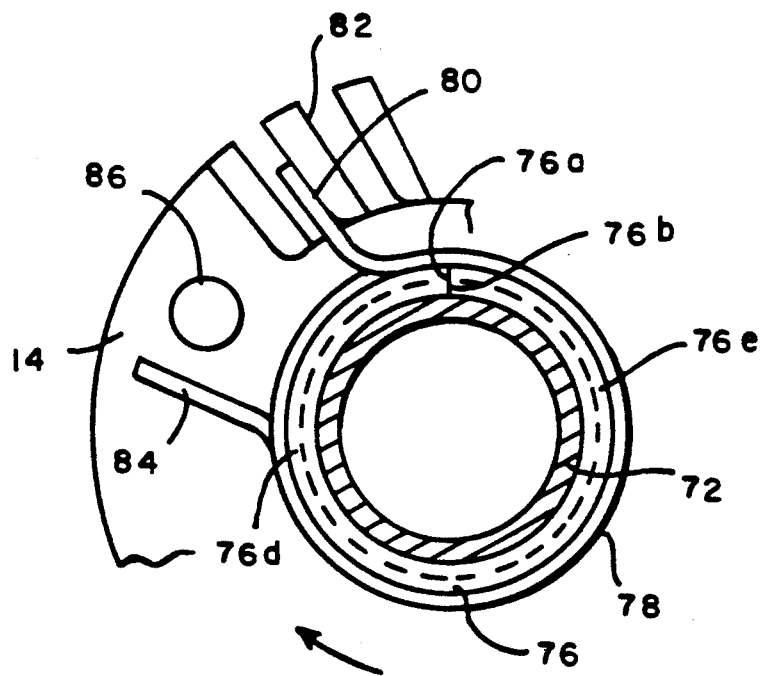
FIG. 10 is a view similar to FIG. 9 showing the parts in the positions they occupy as in FIG. 8.

As best seen in FIGS. 2 and 9, the hub 76 is discontinuous over its periphery and thereby has ends 76a and 76b which define a gap 76c between these ends. The gap 76c allows the adjacent circular portions 76d and 76e of the hub 76 to flex inwardly into the space 79 (FIG. 8) when a force is applied to these adjacent portions of the hub 76 in a radially inward direction. Since the split hub 76 is made from relatively strong spring steel with only a slight degree of resilience, the inward movement of the portions 76d and 76e into the space 79 is very slight, but it is sufficient to allow the portion of the wrap spring 78 which overlies the split hub 76 to deflect inwardly, as seen by comparing the position of the split hub 76 in FIGS. 7 and 8. This inward deflection of the split hub 76 permits a slight amount of additional rotary motion of the annulus 72, which thereby also permits a corresponding amount of additional rotary motion of the tape hub assembly 30 and the tape roll 32, which can best be seen by comparing the positions of the tang 84 of the wrap spring 78 in FIGS. 9 and 10. This additional motion thereby provides an extended deceleration distance for the tape hub assembly 30 and tape roll 32 beyond the virtual instant deceleration Of these parts when the wrap spring grips only a single filed hub as in the device shown in the aforementioned copending application. The energy in the tape roll 32 is transferred to the wrap spring 78 and the split hub 76, and the force needed to deflect the split hub 76 inwardly dissipates enough of the kinetic energy in the tape roll 32 to prevent the tang 80 from being broken at its juncture with the wrap spring coil.

From the foregoing, the operation of the invention should be apparent. When the feed mechanism 54 begins to withdraw tape from the tape roll 32, the wrap spring 78 is firmly gripping the fixed hub 74 and the split hub 76 as seen in FIG. 9, thereby locking the tape hub assembly 30 and the tape roll 32 against rotation. The tensioning roller 42 moves downwardly from the upper position shown in FIGS. 1 and 3 to the lower position shown in FIGS. 1 and 4, thereby taking up the slack in the tape. When the tensioning roller has moved down far enough to cause the stub shaft 86 on the tensioning arm 28 to contact and move the tang 84 of the wrap spring 78 in the the unwinding direction, the wrap spring releases the fixed hub 74 and the split hub 76, as seen in FIG. 6, and permits the tape hub assembly 30 and the tape roll 32 to rotate to dispense tape. When the feed mechanism stops withdrawing tape from the tape roll 32, the spring 58 urges the tensioning arm 28 and the tensioning roller in a clockwise direction to return the tensioning arm 28 to its original position. When the tensioning roller 42 moves upwardly far enough to move the stub shaft 86 out of contact with the tang 84, the wrap spring again grips the fixed hub 74 and the split hub 76, as seen in FIG. 7, thereby tending to lock the tape hub assembly 30 and the tape roll 32 against further rotation instantaneously. However, when the portion of the wrap spring 78 which overlies the split hub 76 grips the outer surface of the split hub 76, it creates the necessary radially inward force to cause the portions 76d and 76e of the split hub 76 to flex inwardly as described above, thereby permitting a slight further degree of rotation of the tape hub assembly 30 and tape roll 32. This slight additional rotation provides sufficient deceleration of the tape hub assembly 30 and tape roll 32 to prevent these parts from generating sufficient shock force on the juncture of the tang 80 with the wrap spring coils to cause this junction to fracture.

It should be understood by those skilled in the art that various modifications may be made in the present invention without departing from the spirit and scope thereof, as described in the specification and defined in the appended claims.

What is claimed is:

1. A wrap spring clutch assembly for the movement of an element which is subjected to repeated intermittent rotary motion about a central axis, said clutch comprising:

a) a frame, b) an element mounted on said frame for rotation about a central axis, said element being subjected to repeated intermittent rotary motion by an external force applied thereto, c) a first circular hub fixedly attached to said element for rotation therewith, d) a wrap spring mounted on said first hub, said wrap spring having a radially outwardly projecting first and second tangs on respective ends thereof, said first being fixedly attached to said frame and said second tang being free for angular movement so as to cause said wrap spring to wind and unwind on said first hub to thereby grip or release said first hub depending on the direction of movement of said second tang, and f) resilient means rotatably mounted on said element adjacent said first hub in a position to underlie a portion of said wrap spring adjacent said first tang whereby said first tang absorbs a portion of the shock generated in said wrap spring from the sudden deceleration of said element when said wrap spring grips said first hub in response to movement of said tang in a direction wind said wrap spring on said first hub and whereby said resilient means prevents said wrap spring from absorbing all of the shock resulting from the sudden deceleration of said element thereby preventing either said first or second tangs from breaking.

2. A wrap spring clutch assembly as set forth in claim 1 wherein said resilient means comprises a second circular hub, said second hub including means permitting said second hub to diminish slightly in diameter against said first hub tending to maintain its normal diameter when said portion of said wrap spring which overlies said second hub slightly diminishes in diameter in response to said second tang moving in a direction to cause said wrap spring to wind on said first hub causing said wrap spring to grip said first hub and suddenly arrest the rotary motion of said element.

3. A wrap spring clutch assembly as set forth in claim 2 wherein said means permitting said second hub to diminish in diameter comprises said second hub being discontinuous around its periphery, thereby having ends which define a relatively small gap there between, whereby when said other tang of said wrap spring is moved angularly in the direction to wind said wrap spring on said first hub, the portion of said wrap spring overlying said second circular hub tends to diminish slightly in diameter and grip said second hub, thereby causing said second circular hub to deflect radially inwardly to absorb some of the shock resulting from the sudden deceleration of said element.

* * * * *